US009559577B2

(12) United States Patent
Bird

(10) Patent No.: US 9,559,577 B2
(45) Date of Patent: Jan. 31, 2017

(54) FLUX FOCUSING MAGNETIC GEAR ASSEMBLY USING FERRITE MAGNETS OR THE LIKE

(71) Applicant: UNIVERSITY OF NORTH CAROLINA AT CHARLOTTE, Charlotte, NC (US)

(72) Inventor: Jonathan Bird, Charlotte, NC (US)

(73) Assignee: The University of North Carolina at Charlotte, Charlotte, NC (US)

(*) Notice: Subject to any disclaimer, the term of this patent is extended or adjusted under 35 U.S.C. 154(b) by 343 days.

(21) Appl. No.: 14/240,049

(22) PCT Filed: Oct. 3, 2012

(86) PCT No.: PCT/US2012/058507
§ 371 (c)(1),
(2) Date: Feb. 21, 2014

(87) PCT Pub. No.: WO2013/052516
PCT Pub. Date: Apr. 11, 2013

(65) Prior Publication Data
US 2014/0210291 A1    Jul. 31, 2014

Related U.S. Application Data

(60) Provisional application No. 61/542,335, filed on Oct. 3, 2011, provisional application No. 61/673,448, filed on Jul. 19, 2012.

(51) Int. Cl.
*H02K 49/10* (2006.01)

(52) U.S. Cl.
CPC ................ *H02K 49/102* (2013.01)

(58) Field of Classification Search
CPC .................. H02K 49/10; H02K 49/102
USPC ............... 310/103, 156.32, 112–114
See application file for complete search history.

(56) References Cited

U.S. PATENT DOCUMENTS

| 6,590,312 B1* | 7/2003 | Seguchi | B60K 6/26 310/114 |
|---|---|---|---|
| 2007/0176505 A1* | 8/2007 | Trzynadlowski | H02K 21/44 310/114 |
| 2008/0088200 A1* | 4/2008 | Ritchey | H02K 16/00 310/268 |
| 2010/0176674 A1 | 7/2010 | Post | |
| 2010/0295389 A1* | 11/2010 | Tessier | H02K 1/145 310/46 |
| 2011/0042965 A1 | 2/2011 | Atallah | |
| 2011/0115326 A1 | 5/2011 | Clarke et al. | |

* cited by examiner

*Primary Examiner* — Naishadh Desai
(74) *Attorney, Agent, or Firm* — Clements Bernard PLLC; Christopher L. Bernard; Lawrence A. Baratta, Jr.

(57) ABSTRACT

The present invention relates generally to a flux focusing magnetic gear assembly using ferrite magnets or the like. The present invention also relates generally to a flux focusing magnetic gear assembly using ferrite magnets or the like that incorporates an outer stator assembly that converts a variable input to a constant output. The present invention further relates generally to an axially aligned flux focusing magnetic gear assembly using ferrite magnets or the like. The improved flux focusing magnetic gear assemblies of the present invention find applicability in traction, wind, and ocean power generation, among other applications.

4 Claims, 6 Drawing Sheets

FLUX FOCUSING MAGNETIC GEAR ASSEMBLY USING FERRITE MAGNETS OR THE LIKE

CROSS-REFERENCE TO RELATED APPLICATIONS

The present patent application/patent claims the benefit of priority of U.S. Provisional Patent Application No. 61/542,335, filed on Oct. 3, 2011, and entitled "FLUX FOCUSING FERRITE MAGNETIC GEAR," and U.S. Provisional Patent Application No. 61/673,448, filed on Jul. 19, 2012, and entitled "CONTINUOUSLY VARIABLE MAGNETIC GEAR," the contents of both of which are incorporated in full by reference herein.

FIELD OF THE INVENTION

The present invention relates generally to an improved flux focusing magnetic gear assembly using ferrite magnets or the like. The present invention also relates generally to an improved flux focusing magnetic gear assembly using ferrite magnets or the like that incorporates an outer stator assembly that converts a variable input to a constant output. The present invention further relates generally to an improved axially aligned flux focusing magnetic gear assembly using ferrite magnets or the like. The improved flux focusing magnetic gear assemblies of the present invention find applicability in traction, wind, and ocean power generation, among other applications.

BACKGROUND OF THE INVENTION

Magnetic gear assemblies offer numerous advantages over counterpart mechanical gear assemblies. Magnetic gear assemblies provide a contactless mechanism for speed amplification (i.e. acoustic noises, vibrations, and wear and tear are all reduced), do not require lubrication (i.e. maintenance costs and pollution are both reduced), have inherent overload protection (i.e. slippage inherently replaces mechanical breakage), and have the potential for high conversion efficiency. Numerous conventional magnetic gear assemblies are known to those of ordinary skill in the art, typically including a plurality of permanent magnets arranged one directly next to another in adjacent or concentric rings or rotors around one or more axes, with steel poles or the like interspersed between the adjacent or concentric rings in an intermediate ring or rotor, for example. The result is selectively actuated relative rotation of the adjacent or concentric rings or rotors, as well as the intermediate ring or rotor, and speed amplification results. Typically, the flux fields of the magnets are purposefully magnetized in a radial direction.

For example, referring specifically to FIG. 1, one conventional magnetic gear assembly 5 includes an inner rotor 10 including $P_1$ magnet pole pairs that rotates at angular velocity $\omega_1$, a middle rotor 12 including $n_2$ ferromagnetic steel poles or the like that rotates at angular velocity $\omega_2$, and an outer rotor 14 including $P_3$ magnet pole pairs that rotates at angular velocity $\omega_3$. The flux fields of the magnets are aligned as illustrated. If the relationship between the poles is chosen to be:

$$P_1 = |P_3 - n_2|, \quad (1)$$

then the inner rotor 10 and the outer rotor 14 interact with the middle rotor 12, via flux linkage, to create space harmonics. The angular velocities of the rotors are related by:

$$\omega_1 = [P_3/(P_3-n_2)]\omega_3 + [n_2/(n_2-P_3)]\omega_2. \quad (2)$$

If the outer rotor 14 is stationary (i.e. $\omega_3=0$), then:

$$\omega_1 = [n_2/(n_2-P_3)]\omega_2 = G\omega_2, \quad (3)$$

where G is the gear ratio. The above referenced flux linkage, and flux focusing, is illustrated specifically in FIG. 2.

Invariably, a rare earth material, such as a neodymium iron boron (Nd—Fe—B) alloy, is used as the permanent magnet material. This can become prohibitively expense, and the use of a less expensive ferrite material is certainly preferred, although the inferior performance of the ferrite material must be compensated for via a superior magnetic gear assembly design.

As alluded to above, magnetic gear assemblies are ideally suited for use in traction, wind, and ocean power generation applications, among others, where, for example, wave energy converters (WECs) or the like produce very low speed translational motions (e.g. 0.1-2 m/s) or rotational motions (5-20 rpm). Generally, given such low speeds, extremely large or extremely high force density devices are required to generate significant power. Exemplary devices include rotary turbo generators—typically driven by an oscillating airflow, hydraulic motor generators—typically driven by a pressurized fluid, and direct drive linear generators—typically driven by sea motion. It is in conjunction with such devices that magnetic gear assemblies prove to be most valuable at present, although the potential applications are virtually limitless.

Thus, what are still needed in the art are improved low cost magnetic gear assemblies using ferrite magnets or the like, that can provide increased angular velocities and gear ratios, while still providing a contactless mechanism for speed amplification, not requiring lubrication, having inherent overload protection, and having the potential for high conversion efficiency.

BRIEF SUMMARY OF THE INVENTION

In one exemplary embodiment, the present invention provides a flux focusing magnetic gear assembly, comprising: an inner rotor comprising a plurality of concentrically disposed inner magnets separated by a plurality of concentrically disposed inner interstitial members, wherein the magnetic fields within the plurality of inner magnets are magnetized azimuthally through their thicknesses such that their opposite poles are at their opposite major planar faces; a middle rotor disposed about the inner rotor and comprising a plurality of concentrically disposed poles separated by one of a plurality of concentrically disposed gaps and plurality of concentrically disposed middle interstitial members; and an outer rotor disposed about the middle rotor and comprising a plurality of concentrically disposed outer magnets separated by a plurality of concentrically disposed outer interstitial members, wherein the magnetic fields within the plurality of outer magnets are magnetized azimuthally through their thicknesses such that their opposite poles are at their opposite major planar faces. The inner interstitial members, the poles, and the outer interstitial members are comprised of a magnetic material, while the middle interstitial members are comprised of air or a nonmagnetic material. The inner rotor is disposed about one of a gap and a nonmagnetic shaft. Optionally, the middle rotor comprises the plurality of concentrically disposed poles separated by and interlocked with the plurality of concentrically disposed middle interstitial members. A performance characteristic of the flux focusing magnetic gear assembly is maximized by optimizing a length of each of the plurality of magnets and a width of each of the plurality of interstitial members.

In another exemplary embodiment, the present invention provides a flux focusing magnetic gear assembly, comprising: an inner rotor comprising a plurality of concentrically disposed inner magnets separated by a plurality of concentrically disposed inner interstitial members, wherein the magnetic fields within the plurality of inner magnets are magnetized azimuthally through their thicknesses such that their opposite poles are at their opposite major planar faces; a middle rotor disposed about the inner rotor and comprising a plurality of concentrically disposed poles separated by one of a plurality of concentrically disposed gaps and plurality of concentrically disposed middle interstitial members; and an outer stator disposed about the middle rotor and comprising one or more concentrated or distributed windings. The inner interstitial members and the poles are comprised of a magnetic material, while the middle interstitial members are comprised of air or a nonmagnetic material. The inner rotor is disposed about one of a gap and a nonmagnetic shaft. Optionally, the middle rotor comprises the plurality of concentrically disposed poles separated by and interlocked with the plurality of concentrically disposed middle interstitial members. A performance characteristic of the flux focusing magnetic gear assembly is maximized by optimizing a length of each of the plurality of magnets and a width of each of the plurality of interstitial members.

In a further exemplary embodiment, the present invention provides an axial flux focusing magnetic gear assembly, comprising: a high speed rotor comprising a plurality of concentrically disposed high speed magnets separated by a plurality of concentrically disposed high speed interstitial members, wherein the magnetic fields within the plurality of high speed magnets are magnetized azimuthally through their thicknesses such that their opposite poles are at their opposite major planar faces; an intermediate rotor disposed axially adjacent to the high speed rotor and comprising a plurality of concentrically disposed poles separated by one of a plurality of concentrically disposed gaps and plurality of concentrically disposed intermediate interstitial members; and a low speed rotor disposed axially adjacent to the intermediate rotor and comprising a plurality of concentrically disposed low speed magnets separated by a plurality of concentrically disposed low speed interstitial members, wherein the magnetic fields within the plurality of low speed magnets are magnetized azimuthally through their thicknesses such that their opposite poles are at their opposite major planar faces. The high speed interstitial members, the poles, and the low speed interstitial members are comprised of a magnetic material, while the intermediate interstitial members are comprised of air or a nonmagnetic material. The high speed rotor, the intermediate rotor, and the low speed rotor are disposed about one of a gap and a nonmagnetic shaft and rotate independently. Optionally, the intermediate rotor comprises the plurality of concentrically disposed poles separated by and interlocked with the plurality of concentrically disposed intermediate interstitial members. A performance characteristic of the axial flux focusing magnetic gear assembly is maximized by optimizing a length of each of the plurality of magnets and a width of each of the plurality of interstitial members.

BRIEF DESCRIPTION OF THE DRAWINGS

The present invention is illustrated and described herein with reference to the various drawings, in which like reference numbers are used to denote like assembly components/method steps, as appropriate, and in which.

DETAILED DESCRIPTION OF THE INVENTION

Figure 1:
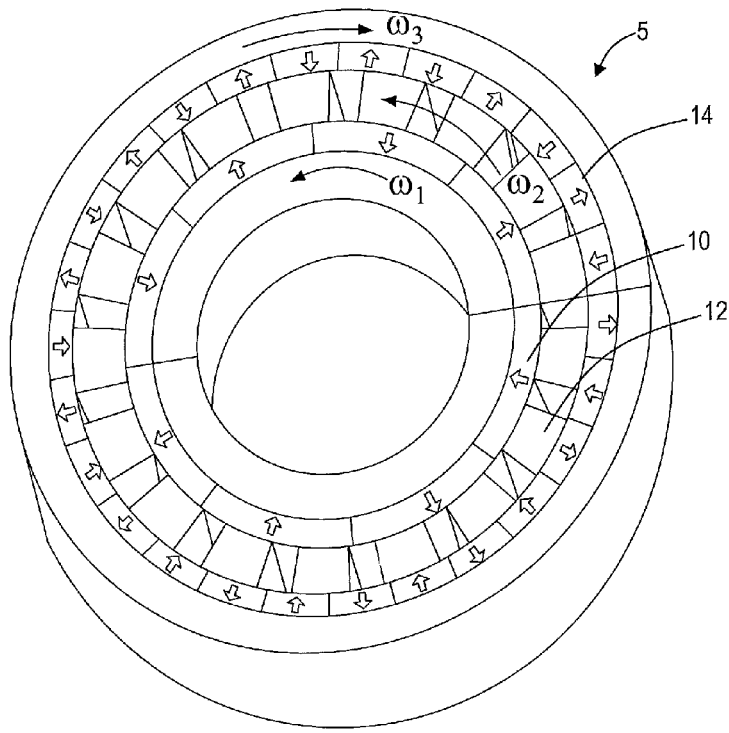
FIG. 1 is a schematic diagram illustrating a conventional magnetic gear assembly.
Figure 2:
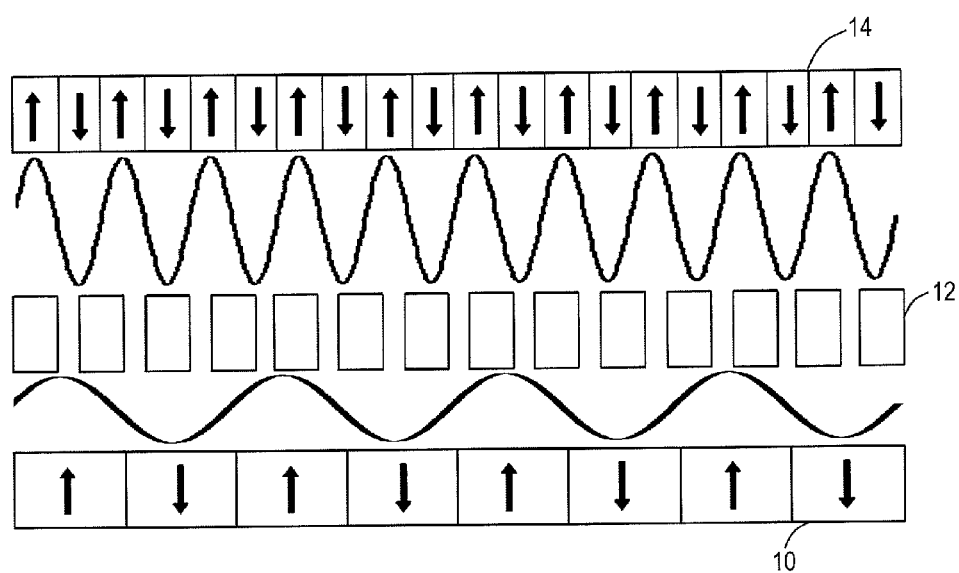
FIG. 2 is a schematic diagram illustrating a principle of operation of the conventional magnetic gear assembly of FIG. 1, as well as, in part, a principle of operation of the magnetic gear assemblies of the present invention.
Figure 3:
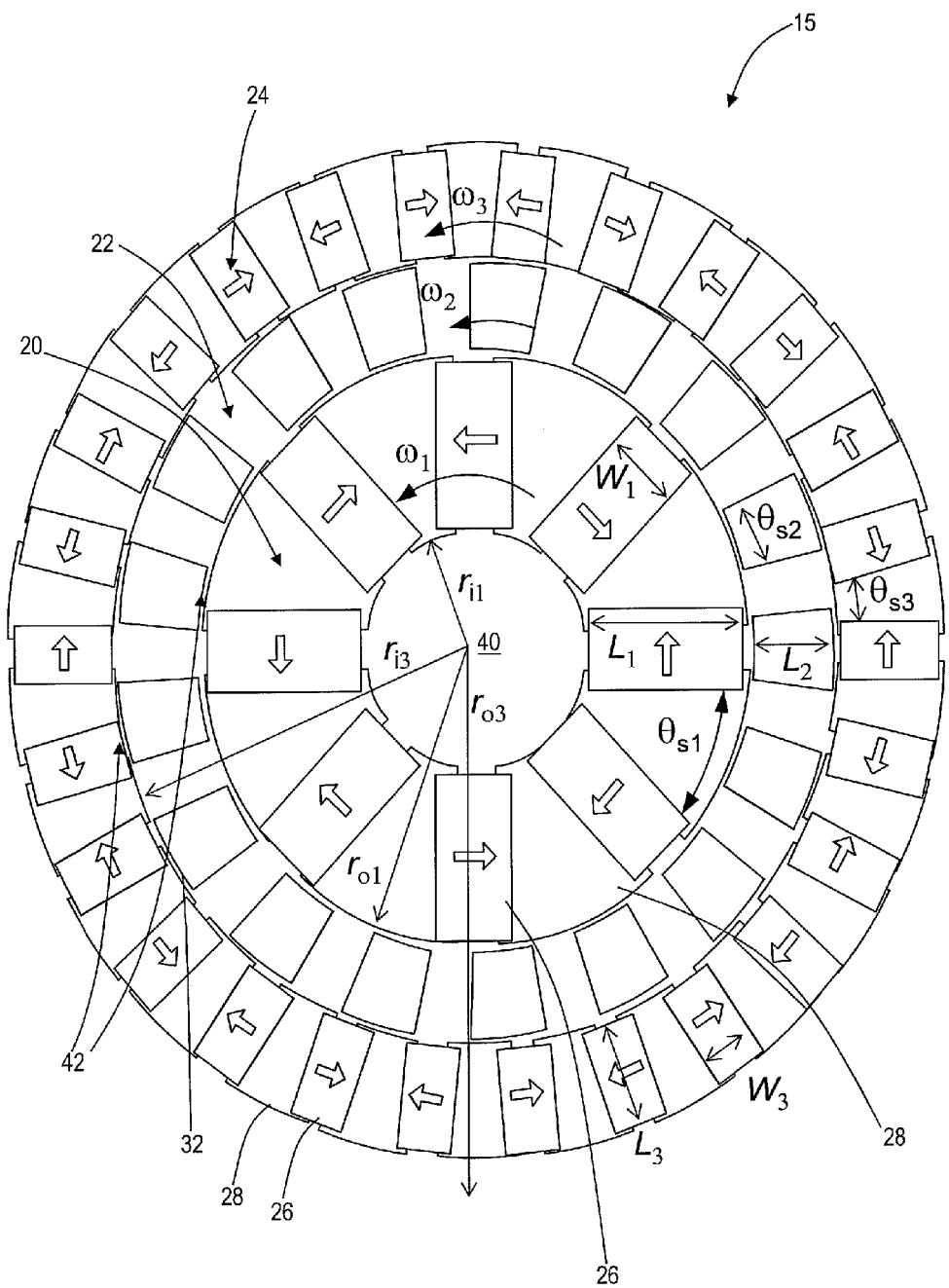
FIG. 3 is a schematic diagram illustrating one exemplary embodiment of the flux focusing magnetic gear assembly of the present invention.

Referring specifically to FIG. 3, in one exemplary embodiment, the flux focusing magnetic gear assembly 15 of the present invention includes an inner rotor 20 including $P_1$ magnet pole pairs that rotates at angular velocity $\omega_1$, a middle rotor 22 including $n_2$ ferromagnetic steel poles or the like that rotates at angular velocity $\omega_2$, and an outer rotor 24 including $P_3$ magnet pole pairs that rotates at angular velocity $\omega_3$. The magnetization directions of the magnets 26 are aligned as illustrated, in a flux focusing arrangement, also referred to herein as a spoke type arrangement. Specifically, the magnets 26 are purposefully magnetized in a substantially azimuthal direction, contrary to the radial direction that has been used conventionally.

Related to the inner rotor 20, the plurality of magnets 26 are separated by a plurality of rectangular, wedge shaped, or annular steel teeth 28 or the like for enhancing flux focusing functionality. The performance of the magnetic gear assembly 15 is, in part, optimized by adjusting the length of the magnets 26, $L_1$, relative to the available angular span, $\theta_{s1}$, provided by each of the steel teeth 28 or the like. Similarly, related to the outer rotor 24, the plurality of magnets 26 are separated by a plurality of rectangular, wedge shaped, or annular steel teeth 28 or the like for enhancing flux focusing functionality. Again, the performance of the magnetic gear assembly 15 is, in part, optimized by adjusting the length of the magnets 26, $L_3$, relative to the available angular span, $\theta_{s3}$, provided by each of the steel teeth 28 or the like. The middle rotor 22 includes a plurality of steel poles 32 or the like, separated by air gaps or the like, in this exemplary embodiment. It should be noted that the inner rotor 20, the middle rotor 22, and the outer rotor 24 are disposed about a common central axis 40 and are separated by small air gaps 42 concentrically, such that they may freely rotate with respect to one another in a frictionless manner. As is described in greater detail herein below, a large number of characteristics and parameters can be, and are, optimized for enhanced performance.

In order to take advantage of flux focusing, the inner rotor 20 should have more than 4 poles. For example, the flux focusing magnetic gear assembly 15 can have $P_1=4$ pole pairs, $n_2=17$ steel poles, $P_3=13$ pole pairs on the outer rotor 24. If the outer rotor 24 is stationary, then $\omega_3=0$, and the gear ratio is:

$$\omega_1=[n_2/(n_2-P_3)]\omega_2=G\omega_2, \quad (4)$$

where $G=4.25\omega_2$. This combination of poles was chosen for illustration purposes because it has a low cogging factor, $C_f=1$. The cogging factor is defined by:

$$C_f=(2P_2n_2)/[\text{LCM}(2P_1,n_2)], \quad (5)$$

where LCM is the lowest common multiple.

Figure 4:
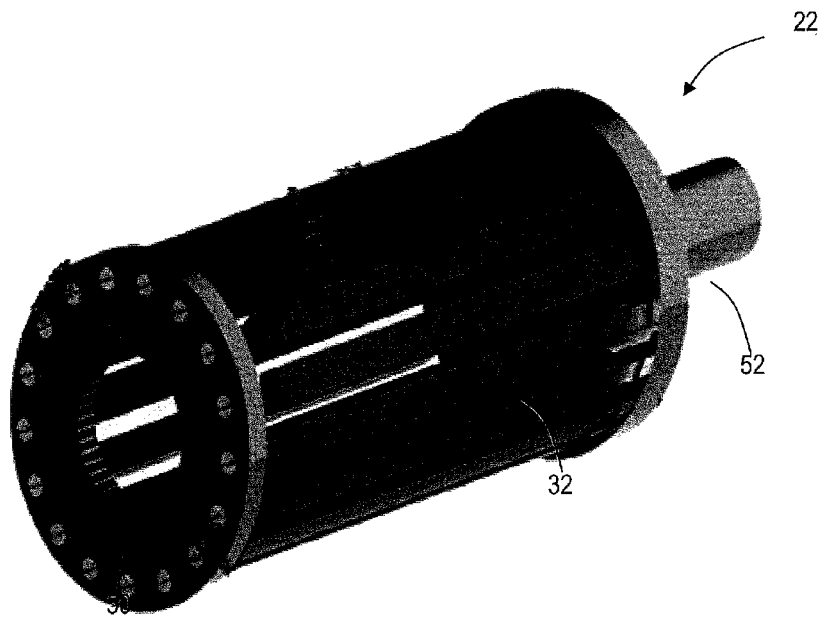
FIG. 4 is a perspective view of one possible physical implementation of the cage rotor of the flux focusing magnetic gear assembly of FIG. 3.

Referring specifically to FIG. 4, in one exemplary embodiment, the middle rotor 22, or cage rotor, includes a plurality of end plates, including a high speed retaining plate 50 and a low speed retaining plate 52, between which the plurality of steel poles 32 or the like are disposed, and to which the inner rotor 20, or high speed rotor, and outer rotor 24, or low speed rotor, are magnetically coupled.

Figure 5:
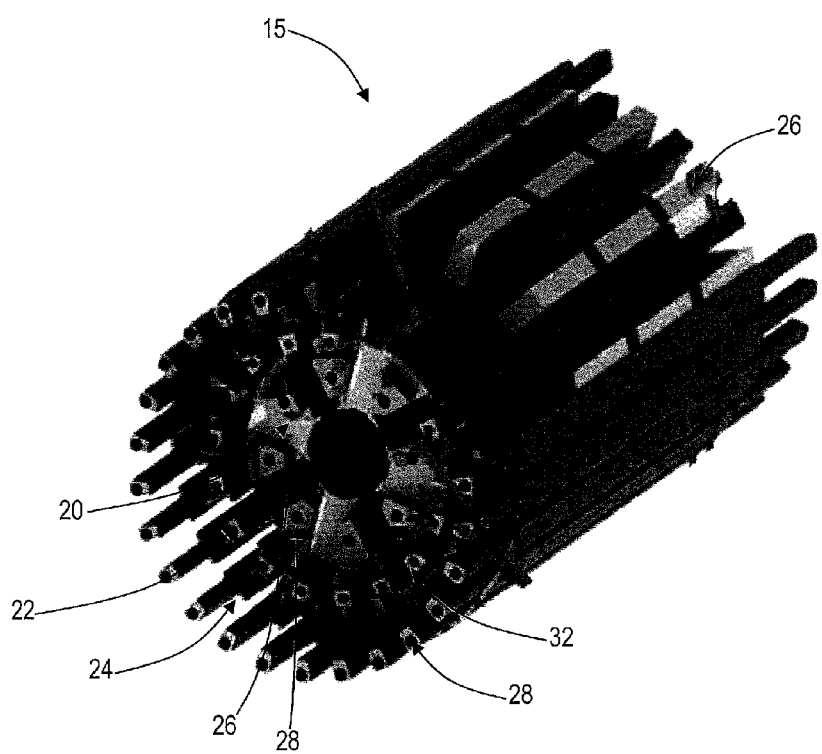
FIG. 5 is a perspective view of one possible physical implementation of the overall flux focusing magnetic gear assembly of FIG. 3.

Referring specifically to FIG. 5, in one exemplary embodiment, the overall construction of the flux focusing magnetic gear assembly 15 is illustrated, including the inner rotor 20, the middle rotor 22, the outer rotor 24, the various magnets 26, the various steel teeth 28 or the like, and the various steel poles 32 or the like. It will be readily apparent to those of ordinary skill in the art that slight modifications can be made to this bulk configuration without changing the functionality thereof.

Exemplary specifications are provided in Table 1 below, for the purpose of providing relative characteristics and dimensions only.

TABLE 1

Exemplary Preliminary Flux Focusing Magnetic Gear Assembly Specifications

| | Description | Value | Units |
|---|---|---|---|
| Inner rotor | Pole pairs, $p_1$ | 4 | |
| | Inner radius, $r_{i1}$ | 13 | mm |
| | Outer radius, $r_{o1}$ | 33 | mm |
| | Steel pole span, $\theta_{s1}$ | $\pi/8$ | rad. |
| | Airgap, g | 0.5 | mm |
| Cage rotor | Steel poles, $n_2$ | 17 | — |
| | Inner radius, $r_{i1}$ | 33.5 | mm |
| | Outer radius, $r_{o1}$ | 46.5 | mm |
| | Steel pole span, $\theta_{s2}$ | $\pi/15$ | rad. |
| Outer cylinder | Pole pairs, $p_3$ | 13 | — |
| | Inner radius, $r_{i3}$ | 47 | mm |
| | Outer radius, $r_{o3}$ | 59 | mm |
| | Steel pole span, $\theta_{s3}$ | $\pi/26$ | rad. |
| | Airgap, g | 0.5 | mm |
| Material | Magnet, Hitachi NMF12F | 0.46 | T |
| | Steel resistivity | $5.1 \times 10^{-7}$ | $\Omega$-m |
| | Stack length, d | 152.4 | mm |

Flux focusing is achieved by first changing the area with which the flux flows through the width of the steel pole 28 relative to the length of the magnets 26. The relation between air gap flux density and magnet flux density is given by:

$$B_gW_sd=B_m2L_1d, \quad (6)$$

where $B_g$ is the air gap flux density, $B_m$ is the magnet flux density, $L_1=r_{o1}-r_{i1}$, d is the active stack length, and $W_s=r_{o1}\theta_{s1}$ is the angular span of the inner rotor steel poles 28. The flux concentration ratio is then given by:

$$C_{\phi1}=B_g/B_m=(2/\theta_{s1})[1-(r_{i1}/r_{o1})]. \quad (7)$$

$C_{\phi1}=3.06$ is obtained for the inner rotor 20 in the present example.

The flux concentration ratio, $C_{\phi3}$, can also be varied to determine the optimum length for the outer rotor magnets 26, using:

$$C_{\phi3}=B_{g3}/B_{m3}=(2/\theta_{s3})[(r_{o3}/r_{-3})-1]. \quad (9)$$

$C_{\phi3}=6.77$, which corresponds to $L_3=15$ mm, gives the highest torque density, as an example.

The cage rotor steel pole length, $L_2$, can further be varied, from 3 to 24 mm in the present example, by way of illustration.

$$L_2r_{o2}-r_{i2}. \quad (10)$$

It is observed that $L_2=6$ mm provides the highest torque density and lowest torque ripple.

The cage rotor steel pole span, $\theta_{s2}$, can still further be varied, keeping other parameters constant.

$$W_{s23}=\theta_{s2}/\theta_{s3}. \quad (11)$$

$\theta_{s2}=14$ degrees and $W_{s23}=2.36$ provides the maximum torque density, by way of illustration.

As a result, a final flux focusing magnetic gear assembly design is achieved, after parametric optimization (which is example specific), including the design parameters provided in Table 2, for the purpose of providing relative characteristics and dimensions only.

TABLE 2

Exemplary Final Flux Focusing Magnetic Gear Assembly Specifications

| | Description | Value | Units |
|---|---|---|---|
| Inner rotor | Pole pairs, $p_1$ | 4 | |
| | Inner radius, $r_{i1}$ | 13 | mm |
| | Outer radius, $r_{o1}$ | 33 | mm |
| | Steel pole span, $\theta_{s1}$ | $\pi/8$ | rad. |
| | Airgap, g | 0.5 | mm |
| Cage rotor | Steel poles, $n_2$ | 17 | — |
| | Inner radius, $r_{i1}$ | 33.5 | mm |
| | Outer radius, $r_{o1}$ | 39.5 | mm |
| | Steel pole span, $\theta_{s2}$ | $7\pi/90$ | rad. |
| Outer cylinder | Pole pairs, $p_3$ | 13 | — |
| | Inner radius, $r_{i3}$ | 40 | mm |
| | Outer radius, $r_{o3}$ | 15 | mm |
| | Steel pole span, $\theta_{s3}$ | $\pi/26$ | rad. |
| | Airgap, g | 0.5 | mm |
| Material | magnet, Hitachi NMF12F | 0.46 | T |
| | Steel resistivity | $5.1 \times 10^{-7}$ | $\Omega$m |
| | Stack length, d | 152.4 | mm |

It should be noted that the common central shaft portion of the flux focusing magnetic gear assembly 15 of the present invention can be open, nonmagnetic, or complex, as is illustrated in FIG. 4, for example, with the middle rotor 22, or cage rotor, including a plurality of end plates, including a high speed retaining plate 50 and a low speed retaining plate 52, between which the plurality of steel poles 32 or the like are disposed. An input shaft (not illustrated) and bearing housing (not illustrated) can then be included on the high speed retaining plate 50 and low speed retaining plate 52, respectively.

Figure 6:
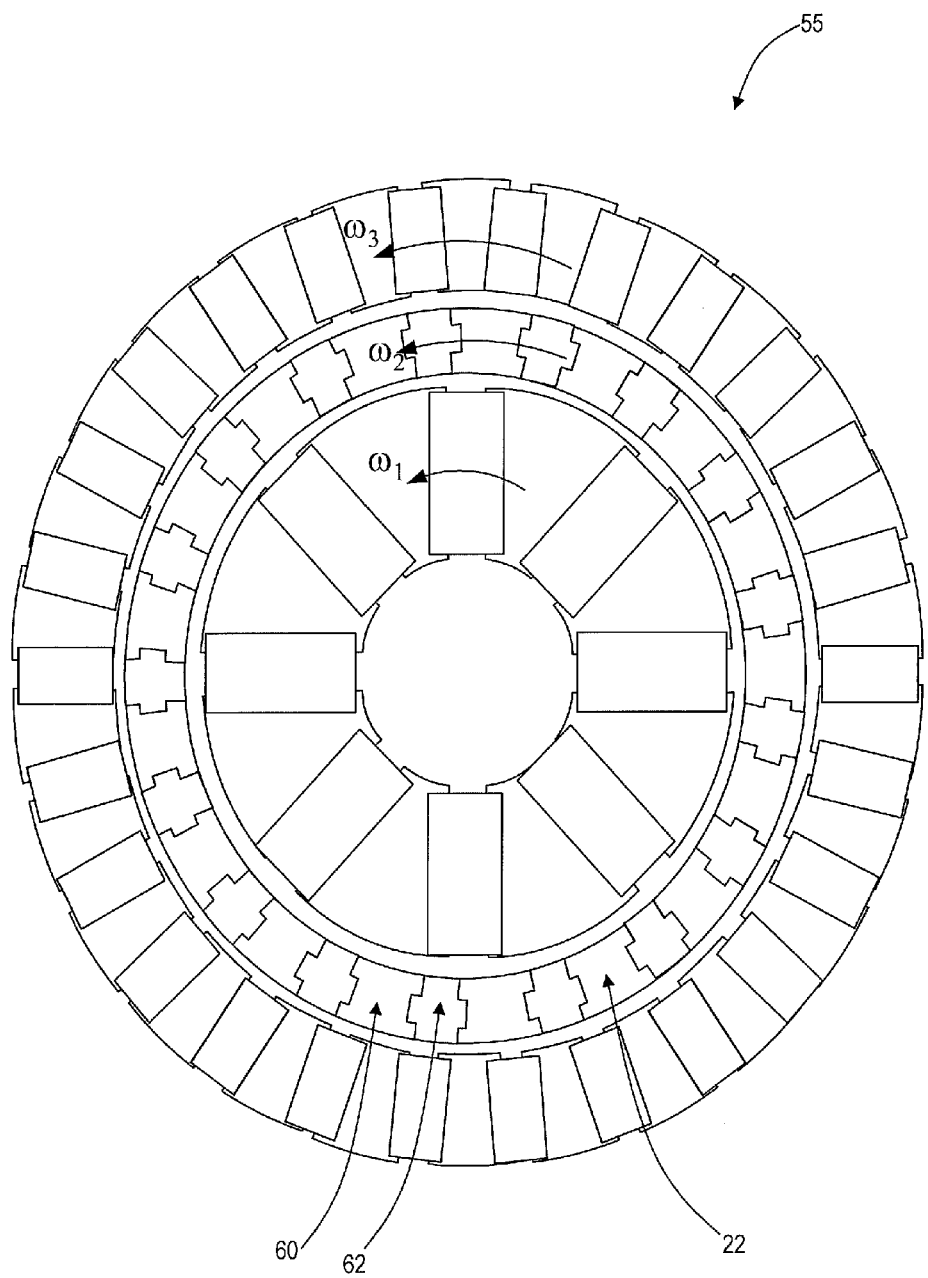
FIG. 6 is a schematic diagram illustrating another exemplary embodiment of the flux focusing magnetic gear assembly of the present invention, including a middle rotor that utilizes a plurality of keyed and interlocked poles and interstitial members.

Referring specifically to FIG. 6, in another exemplary embodiment, it should also be noted that the middle rotor 22 can include a plurality of keyed and interlocked poles 60 and interstitial members 62 (a plurality of slotted and recessed poles 60 and interstitial members are illustrated, as an example). The poles 60 include a soft magnetic composite (SMC) material, such as bound steel particles or the like, and the interstitial members 62 include a nonmagnetic material, such as bundled carbon fibers or the like, creating a structurally unified middle rotor 22. Such an arrangement may also be applied to other stages, as desired.

Figure 7:
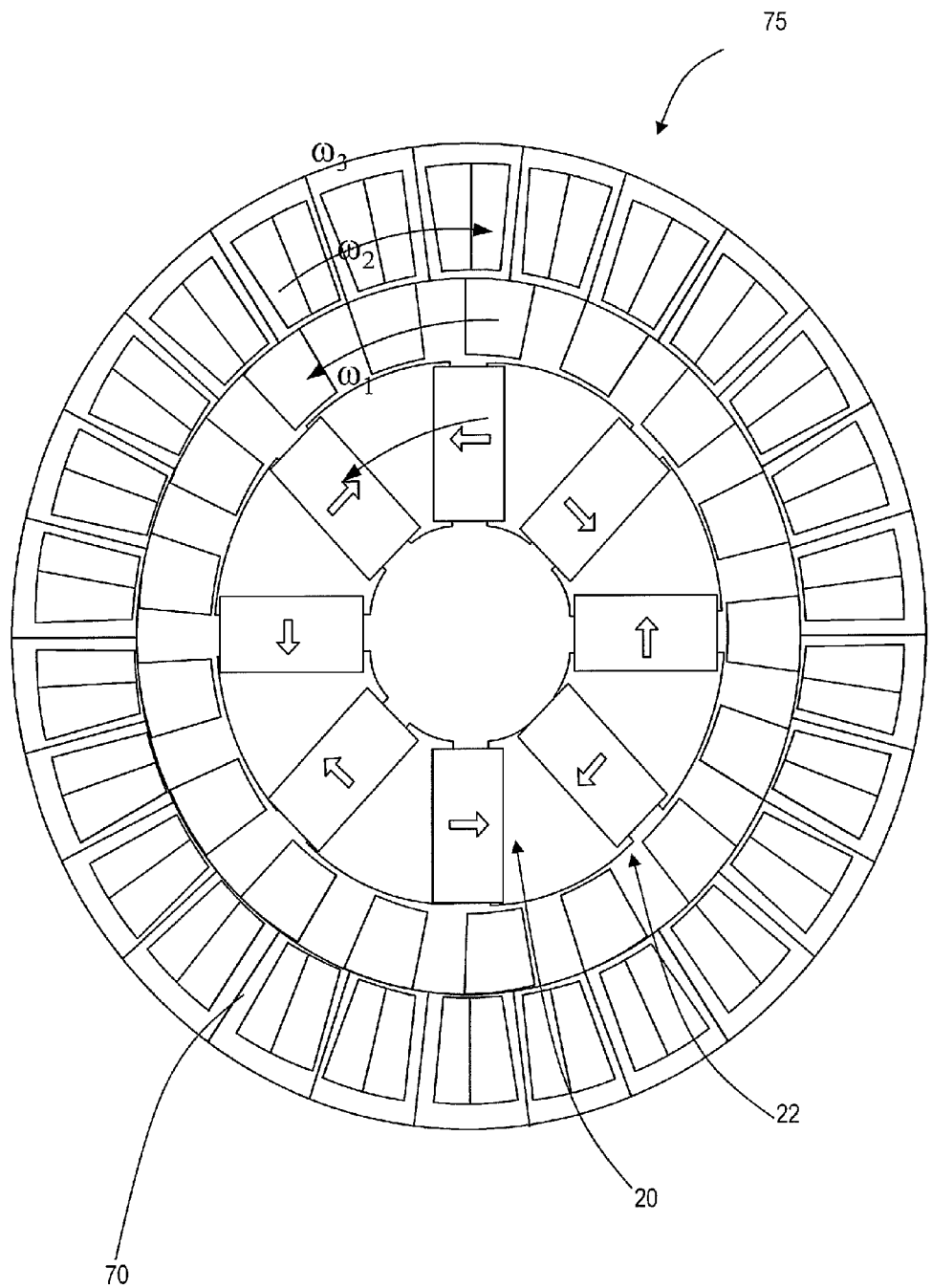
FIG. 7 is a schematic diagram illustrating a further exemplary embodiment of the flux focusing magnetic gear assembly of the present invention, including a stator that replaces the outer rotor thereof.

Referring specifically to FIG. 7, in a further exemplary embodiment, the outer rotor 24 (see FIG. 3) of the flux focusing magnetic gear assembly 75 is replaced with a stator 70, including a stationary winding that is used to create a rotating field, rather than a fixed field, when using permanent magnets 26. The stator electrical frequency, $\omega_c$, and mechanical frequency, $\omega_3$, are related by $\omega_3 = \omega_c/P_3$. Equation (1) is then:

$$\omega_1 = [1/(P_3 - n_2)]\omega_c + [n_2/(n_2 - P_3)]\omega_2. \quad (12)$$

Therefore, the use of windings results in the gear ratio being continuously variable. With $P_1 = 4$, $P_3 = 13$, and $n_2 = 17$, the speed relationship is:

$$\omega_1 = -0.25\omega_c + 4.25\omega_2. \quad (13)$$

It is then noted that, if the input speed, $\omega_2$, from a turbine, for example, is varying, then the output mechanical speed, $\omega_1$, can be made constant by controlling the frequency, $\omega_c$. At the same time, the mechanical speed is amplified. The windings 75 shown are concentrated windings, however, distributed windings or the like can also be used. A surface mounted rotor, rather than a spoke type rotor, can also be used in this embodiment.

The torque magnitude, and therefore the power flow, can also be varied by varying the converter voltage level. This topology was studied by others for a traction motor. However, in this analysis, only the high speed rotor was rotating. A continuously variable magnetic gear (CVMG) with two rotors has not been studied by others. By combining this CVMG with a low cost permanent magnet synchronous generator (PMSG) or the like, the resultant system can act like a gearbox and doubly fed induction generator (DFIG), but without the need for brushes or a mechanical gearbox. Also, unlike a direct drive system, the PMSG can be sized to be relatively small because the input speed into the generator is high. In order to further increase the rotational speeds up to an acceptable level for the generator, a second and possibly third magnetic gear set can be used (wind turbines typically use multiple gearboxes, for example). This topology is particularly low cost because it requires minimal energy storage.

A further possibility that is available when using a magnetic gear with windings is the ability to create high speed unidirectional rotational motion from low speed oscillatory motion. This is an important characteristic for WECs, since the speed of the prime mover is typically oscillating. If the stator 70 is replaced by a dual winding and, as an example, winding one is designed to create $P_3 = 13$ pole pairs, while winding two creates $P_3 = 21$ pole pairs, then it is noted by looking at equation 12 that, if only the winding one is turned on, since $n_2 = 17$, the speed relationship is $\omega_1 = -0.25\omega_c + 4.25\omega_2$, while if only the winding two is turned on, the speed relationship is, $\omega_1 = +0.25\omega_c - 4.25\omega_2$. Therefore, by choosing to turn on the correct stator winding, an oscillatory WEC rotation, $\omega_2$, can be converted to speed amplified unidirectional rotation by a noncontact means; the speed smoothing can be achieved by added or subtracting the electrical frequency, $\omega_c$.

Figure 8:
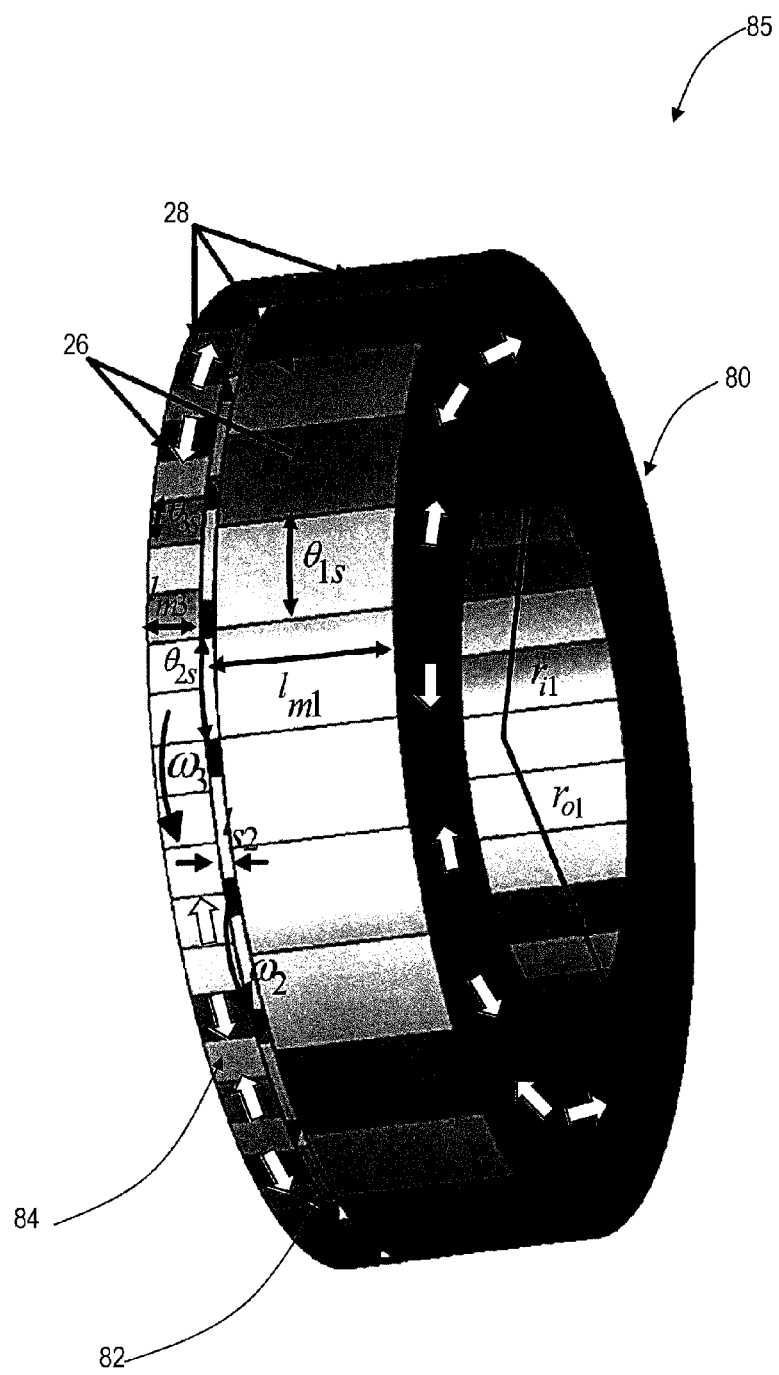
FIG. 8 is a schematic diagram illustrating a still further exemplary embodiment of the flux focusing magnetic gear assembly of the present invention, utilizing an axial rotor alignment.

Referring specifically to FIG. 8, in a still further exemplary embodiment, the flux focusing magnetic gear assembly 85 of the present invention includes a high speed rotor 80 including $P_1$ magnet pole pairs that rotates at angular velocity $\omega_1$, an intermediate rotor 82 including $n_2$ ferromagnetic steel poles or the like that rotates at angular velocity $\omega_2$, and a low speed rotor 84 including $P_3$ magnet pole pairs that rotates at angular velocity $\omega_3$. The flux fields of the magnets 26 are aligned as previously illustrated, in a flux focusing and flux concentrating arrangement, also referred to herein as a spoke type arrangement. Specifically, the flux fields of the magnets 26 are purposefully magnetized in a substantially azimuthal direction, contrary to the radial direction that has been used conventionally.

Related to the high speed rotor 80, the plurality of magnets 26 are separated by a plurality of rectangular, wedge shaped, or annular steel teeth 28 or the like for enhancing flux focusing functionality. The performance of the magnetic gear assembly 85 is, in part, optimized by adjusting the depth of the magnets 26, $l_{m1}$, relative to the available angular span, $\theta_{1s}$, provided by each of the steel teeth 28 or the like. Similarly, related to the low speed rotor 84, the plurality of magnets 26 are separated by a plurality of rectangular, wedge shaped, or annular steel teeth 28 or the like for enhancing flux focusing functionality. Again, the performance of the magnetic gear assembly 85 is, in part, optimized by adjusting the depth of the magnets 26, $l_{m3}$, relative to the available angular span, $\theta_{3c}$, provided by each of the steel teeth 28 or the like. The intermediate rotor 82 includes a plurality of steel poles 28 or the like, separated by air gaps or the like, in this exemplary embodiment. The high speed rotor 80, the intermediate rotor 82, and the low speed rotor 84 are disposed substantially adjacent to one another about a common central axis and are separated by small air gaps axially, such that they may freely rotate with respect to one another in a frictionless manner. Again, a large number of characteristics and parameters can be, and are, optimized for enhanced performance. Exemplary configurations are provided in Table 3 below, for the purpose of providing relative characteristics and dimensions only.

TABLE 3

Exemplary Axial Flux Focusing Magnetic Gear Assembly Specifications

| | Description | Value | Units | | | Description | Value | Units | |
|---|---|---|---|---|---|---|---|---|---|
| High Speed Rotor | Pole pairs, $p_1$ | 7 | — | | High Speed Rotor | Pole pairs, $p_1$ | 6 | — | |
| | Stack length, $l_{m1}$ (Z-axis) | 100 | mm | | | Stack length, $l_{m1}$ (Z-axis) | 60 | mm | |
| | Width, $\theta_{1s}$ | 2π/28 | rad. | | | Width, $\theta_{1s}$ | 2π/24 | rad. | |
| | Airgap (axial) | 0.5 | mm | | | Airgap (axial) | 0.5 | mm | |
| Low speed rotor | Pole pairs, $p_3$ | 15 | — | | Low speed rotor | Pole pairs, $p_3$ | 19 | — | |
| | Stack length, $l_{m3}$ (Z-axis) | 30 | mm | | | Stack length, $l_{m3}$ (Z-axis) | 40 | mm | |
| | Width $\theta_{3s}$ | 2π/60 | rad. | | | Width $\theta_{3s}$ | 2π/76 | rad. | |
| | Airgap (axial) | 0.5 | mm | | | Airgap (axial) | 0.5 | mm | |

TABLE 3-continued

Exemplary Axial Flux Focusing Magnetic Gear Assembly Specifications

| | Description | Value | Units | | | Description | Value | Units | |
|---|---|---|---|---|---|---|---|---|---|
| Steel poles | Steel poles, $n_2$ | 22 | — | | Steel poles | Steel poles, $n_2$ | 25 | — | |
| | Stack length, $l_{s2}$ (Z-axis) | 7 | mm | | | Stack length, $l_{s2}$ (Z-axis) | 7 | mm | |
| | Width $\theta_{2s}$ | 12 | | | | Width $\theta_{2s}$ | 9.4 | | |
| | Airgap (axial) | 0.5 | mm | | | Airgap (axial) | 0.5 | mm | |
| Material | Magnets: Hitachi NMF12F | 0.46 | T | | Material | Magnets: Hitachi NMF12F | 0.46 | T | |
| | Steel resistivity, Grade 416 | 0 | Ωm | | | Steel resistivity, Grade 416 | 0 | Ωm | |
| | Total axial length, | 138 | mm | | | Total axial length, | 108 | mm | |
| | Inner radius, $\tau_{i1}$ | 140 | mm | | | Inner radius, $\tau_{i1}$ | 70 | mm | |
| | Outer radius, $\tau_{o1}$ | 250 | mm | | | Outer radius, $\tau_{o1}$ | 185 | mm | |

Although the present invention has been illustrated and described herein with reference to preferred embodiments and specific examples thereof, it will be readily apparent to those of ordinary skill in the art that other embodiments and examples may perform similar functions and/achieve like results. All such equivalent embodiments and examples are within the spirit and scope of the present invention, are contemplated thereby, and are intended to be covered by the following claims.

What is claimed is:

1. A flux focusing magnetic gear assembly, comprising:
an inner rotor comprising a plurality of concentrically disposed inner magnets separated by a plurality of concentrically disposed inner interstitial members, wherein the magnetic fields within the plurality of inner magnets are magnetized azimuthally through their thicknesses such that their opposite poles are at their opposite major planar faces;
a middle rotor disposed about the inner rotor and comprising a plurality of concentrically disposed poles separated by one of a plurality of concentrically disposed gaps and plurality of concentrically disposed middle interstitial members; and
an outer rotor disposed about the middle rotor and comprising a plurality of concentrically disposed outer magnets separated by a plurality of concentrically disposed outer interstitial members, wherein the magnetic fields within the plurality of outer magnets are magnetized azimuthally through their thicknesses such that their opposite poles are at their opposite major planar faces.

2. The flux focusing magnetic gear assembly of claim 1, wherein the inner interstitial members, the poles, and the outer interstitial members are comprised of a magnetic material and the middle interstitial members are comprised of one of air and a nonmagnetic material.

3. The flux focusing magnetic gear assembly of claim 1, wherein the inner rotor is disposed about one of a gap and a nonmagnetic shaft.

4. The flux focusing magnetic gear assembly of claim 1, wherein a performance characteristic of the flux focusing magnetic gear assembly is maximized by optimizing a length of each of the plurality of magnets and a width of each of the plurality of interstitial members.

* * * * *